United States Patent

Marks

[11] Patent Number: 5,185,427
[45] Date of Patent: Feb. 9, 1993

[54] PROCESS FOR THE PRODUCTION OF COPOLYAMIDES FROM AMINO NITRILE, DIAMINE AND DICARBOXYLIC ACID

[75] Inventor: David N. Marks, Wilmington, Del.

[73] Assignee: E. I. Du Pont de Nemours and Company, Wilmington, Del.

[21] Appl. No.: 752,942

[22] Filed: Aug. 20, 1991

[51] Int. Cl.$^5$ .................. C08G 69/00; C08G 69/26
[52] U.S. Cl. .................. 528/329.1; 528/310; 528/324
[58] Field of Search ............... 528/329.1, 324, 310

[56] References Cited

U.S. PATENT DOCUMENTS 4,568,736  2/1986  Curatolo et al. .................. 528/310

Primary Examiner—Harold D. Anderson
Attorney, Agent, or Firm—Earl L. Handley

[57] ABSTRACT

Copolyamides are prepared by the non-catalytic polymerization of an omega-aminonitrile with a mixture of a diamine and a dicarboxylic acid. Not more than 40% by weight of the product is derived from the omega-aminonitrile.

5 Claims, No Drawings

PROCESS FOR THE PRODUCTION OF COPOLYAMIDES FROM AMINO NITRILE, DIAMINE AND DICARBOXYLIC ACID

FIELD OF THE INVENTION

This invention relates to the production of copolyamides by the non-catalytic polymerization of an omega-aminonitrile with a mixture of a diamine and a dicarboxylic acid.

BACKGROUND OF THE INVENTION

U.S. Pat. No. 2,245,129 to Greenewalt discloses a non-catalytic 20 plus hour process for the polymerization of 6-aminocapronitrile to high molecular weight polymer.

U.S. Pat. No. 4,568,736 to Curatolo et al. discloses a catalytic process for the polymerization of omega-aminonitrile either alone or in combination with other polyamide forming monomers.

It is conventional practice to form polyamide molding powders by the non-catalytic polymerization of a dicarboxylic acid and a diamine. Catalysts are detrimental to the color and stability of the polymer, and catalytic residues in the polymer restrict its uses.

It is, therefore, desirable to have a fast, non-catalytic process for the production of polyamide copolymers. It is an object of the present invention to provide such a process.

SUMMARY OF THE INVENTION

The catalytic polymerization of 6-aminocapronitrile with 3-aminopropionitrile or with hexamethylene diamine and adiponitrile or with hexamethylene diamine and adipic acid is taught in U.S. Pat. No. 4,568,736. However, a non-catalytic process in a commercially attractive time is not known. It has now been found that copolyamides of an omega-aminonitrile and a diamine and a diacid can be obtained in a catalyst-free process in a commercially attractive time, although it is still not possible to obtain in a non-catalytic process copolyamides of an omega-aminonitrile with hexamethylene diamine and adiponitrile or with 3-aminopropionitrile. The present invention thus is:

A process for the preparation of copolyamide which comprises forming a reaction mixture consisting of an omega-aminonitrile having 6 to 12 carbon atoms and an aqueous solution containing approximately equal molar amounts of a diamine and a dicarboxylic acid, heating the reaction mixture to a temperature in the range of at least 260 degrees C but less than 310 degrees C at a pressure of about between 13 and 25 atmospheres while continuously removing water vapor and ammonia for a time period of not more than about 3 hours, and recovering copolyamide having a number average molecular weight of at least about 9000, said omega-aminonitrile being present in the reaction mixture in an amount such that at least 1% by weight and not more than 40% by weight of the copolyamide is derived from the omega-aminonitrile.

DETAILED DESCRIPTION OF THE INVENTION

Any omega-aminonitrile may be used as a monomer for this invention. Preferred are the omega-aminonitriles shown in U.S. Pat. No. 4,568,736 i.e. those having the formula:

$$H_2N-R-CR'H-CN$$

where R is a divalent organic racial and R' is hydrogen or a univalent organic radical. Preferred compounds are those where both R and R' are linear aliphatic radicals, and the compound has 6 to 12 carbon atoms. Representative examples include, 6-aminocapronitrile, 4-aminomethylbenzonitrile, 12-aminododecanenitrile, etc.

Suitable diamines include aliphatic diamines having 3 to 12 carbon atoms. Hexamethylene diamine is preferred.

Suitable diacids include aliphatic and aromatic diacids. The aliphatic and the aromatic acids may contain 6 to 12 carbon atoms. Adipic acid and terephthalic acids are preferred.

The omega-aminonitrile is hydrolyzed during the process, but if the amount of omega-aminonitrile exceeds the amount necessary to make a copolyamide having more than 40% by weight derived from the omega-aminonitrile, then there will be so many unhydrolyzed groups in the product that the molecular weight of the product is unsatisfactory, that is, the polymer will have a number average molecular weight of less than 9000.

In the reaction mixture, the diamine and the diacid should be present in approximately equal molar amounts in order to make a product with a satisfactory molecular weight.

Water should be present in the aqueous solution in the amount of at least 25 weight percent, but not more than about 50 weight percent.

Polymerization Conditions a. Temperature. The final polymerization temperature is normally chosen based on the melting point of the polyamide. The final temperature is usually at least 10° C. higher than the melting point. Temperatures above about 310° C. will lead to polymer degradation. To achieve a reasonable rate of increase in molecular weight, the final temperature is usually at least 260 to 270° C. At lower temperatures the rate of reaction is reduced so longer reaction times are required to make high molecular weight polymer.

b. Pressure. Copolymers have been made with pressures between about 13 and 25 atmospheres, preferably in the range 15-21 atmospheres. At higher pressure poorer polymer color and molecular weight are observed. At lower pressures more unreacted aminonitrile is lost by vaporization from the reaction.

EXAMPLES

1. A 300 cc stainless steel autoclave was charged with 100 grams of 51.5% aqueous nylon 66 salt solution (an equal molar mixture of adipic acid and hexamethylene diamine) and 11 grams of 6-aminocapronitrile.

2. A regulator controlling the pressure in the system was set for 250 psig; i.e. pressure will build up in the system to 250 psig and then vapor will be released through this regulator to control the pressure at this setting.

3. The autoclave was closed and purged several times with 20 psig of nitrogen to purge air from the system.

4. The contents of the autoclave were agitated and heated in 60 minutes to 250° C. Heat was supplied by an electric band heater surrounding the autoclave. The temperature was controlled.

5. After reaching 250° C., the pressure in the system was reduced from 250 psig to atmospheric pressure over one hour by adjusting the pressure regulator. During the pressure reduction the temperature was increased to 275° C.

6. The reaction continued while heating at 275° C. and one atmosphere pressure for 45 minutes.

7. The heat and the agitation on the autoclave were turned off. The contents of the autoclave were cooled under an atmosphere of steam.

8. After cooling, the polymer was removed in a block from the autoclave and crushed. The polymer was dried at 90° C. under vacuum. The relative viscosity (RV) of an 8.4 wt% polymer solution in 90.0% formic acid was found to be 34. Inherent viscosities (IVs) were measured in sulfuric acid for the polymers that were insoluble in formic acid.

| Copolymerization of 6-aminocapronitrile | | | | |
|---|---|---|---|---|
| Example # | Salt | % Nylon 6 in Final Polymer | RV | Molecular Weight* |
| 1 | nylon 6T** | 40% | 1.0*** | 17,000 |
| 2 | nylon 66 | 10% | 44 | 15,600 |
| 3 | nylon 66 | 20% | 34 | — |
| 4 | nylon 66 | 25% | 29 | — |
| 5 | nylon 66 | 30% | 23 | — |
| 6 | nylon 66 | 40% | 17 | 9,200 |

*(number average molecular weight determined by gel permeation chromatography)
**hexamethylene diamine and terephthalic acid
***inherent viscosity

| Copolymerization of 12-aminododecanenitrile | | | | |
|---|---|---|---|---|
| Example # | Salt | % Nylon 12 in Final Polymer | RV | Molecular Weight |
| 7 | nylon 66 | 20% | 16 | — |

I claim:

1. A process for the preparation of copolyamide which consists of forming a reaction mixture consisting of an omega-aminonitrile having 6 to 12 carbon atoms and an aqueous solution containing approximately equal molar amounts of a diamine and a dicarboxylic acid, heating the reaction mixture to a temperature in the range of at least 260 degrees C. but less than 310 decrees C. at a pressure of about between 13 and 25 atmospheres while continuously removing water vapor and ammonia for a time period of not more than about 3 hours, and recovering copolyamide having a number average molecular weight of at least 9000, said omega-aminonitrile being present in the reaction mixture in an amount such that at least 1% by weight and not more than 40% by weight of the copolyamide is derived from the omega-aminonitrile.

2. A catalyst-free process for the preparation of copolyamide which comprises forming a reaction mixture consisting of an omega-aminonitrile having 6 to 12 carbon atoms and an aqueous solution containing approximately equal molar amounts of a diamine and dicarboxylic acid, heating the reaction mixture to a temperature in the range of at least 260 degrees C. but less than 310 degrees C. at a pressure of about between 13 and 25 atmospheres while continuously removing water vapor and ammonia for a time period of not more than about 3 hours, and recovering copolyamide having a number average molecular weight of at least about 9000, said omega-aminonitrile being present in the reaction mixture in an amount such that at least 1% by weight and not more than 40% by weight of the copolyamide is derived from the omega-aminonitrile.

3. The process of claim 2 in which the omega-aminonitrile is 6-aminocapronitrile, and the aqueous solution contains adipic acid and hexamethylene diamine.

4. The process of claim 2 in which the omega-aminonitrile is 6-aminocapronitrile, and the aqueous solution contains terephthalic acid and hexamethylene diamine.

5. The process of claim 2 in which the omega-aminonitrile is 12-aminododecanenitrile.

* * * * *